W. R. EIMER.
GRINDING MACHINE FOR CLOSURE DEVICES.
APPLICATION FILED APR. 20, 1917.

1,243,496.

Patented Oct. 16, 1917.
5 SHEETS—SHEET 1.

Inventor
Walter R. Eimer
By his Attorney

W. R. EIMER.
GRINDING MACHINE FOR CLOSURE DEVICES.
APPLICATION FILED APR. 20, 1917.
1,243,496.
Patented Oct. 16, 1917.
5 SHEETS—SHEET 2.
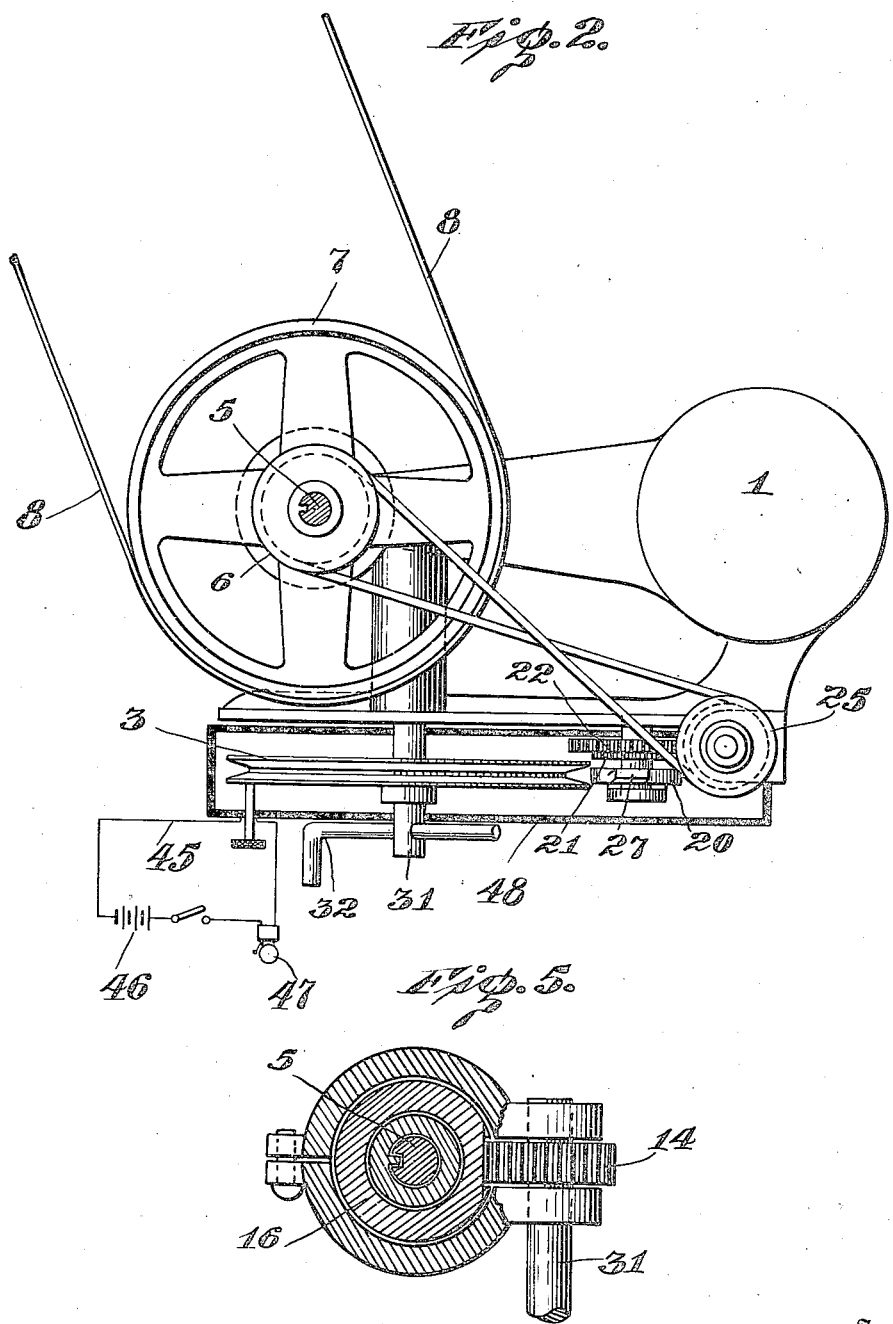

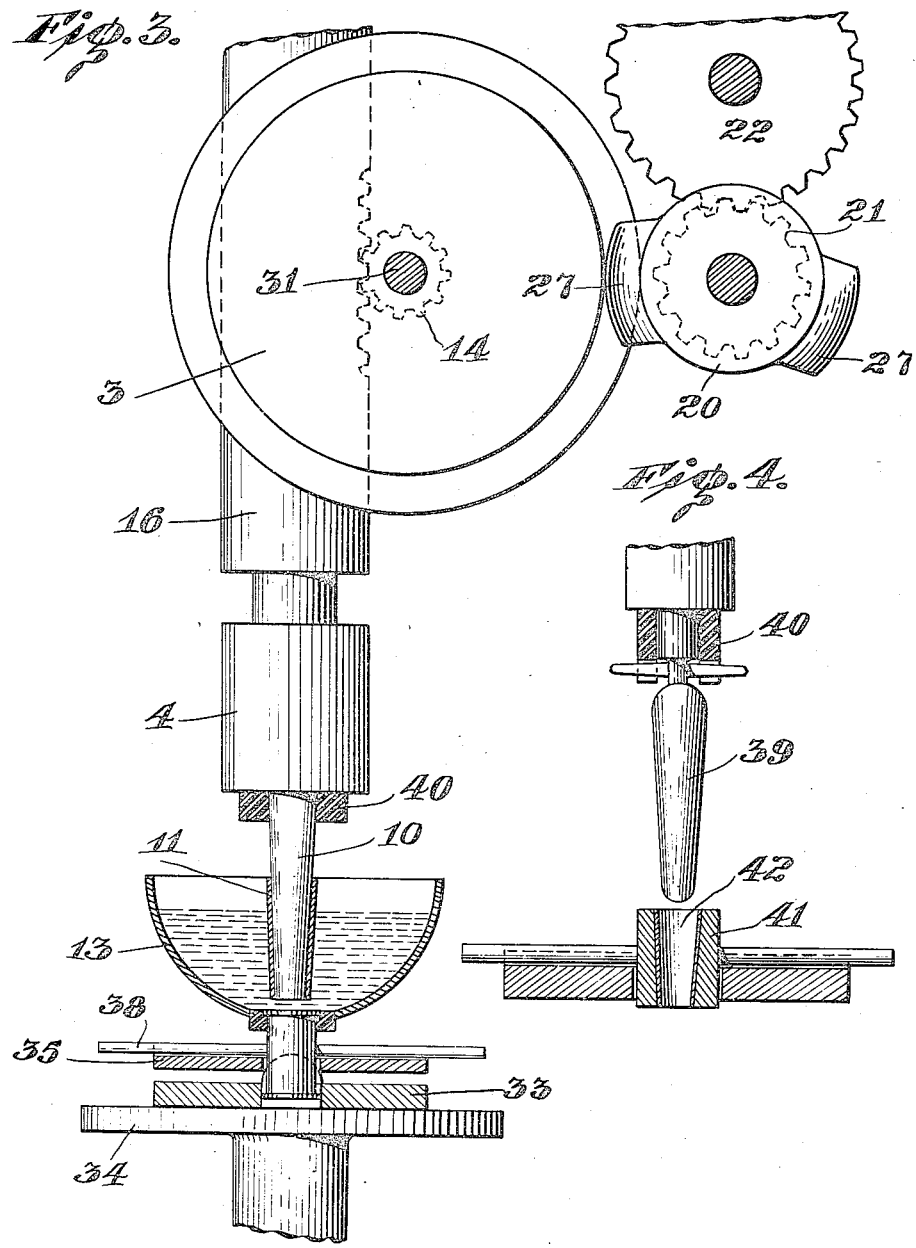

W. R. EIMER.
GRINDING MACHINE FOR CLOSURE DEVICES.
APPLICATION FILED APR. 20, 1917.

1,243,496.

Patented Oct. 16, 1917.
5 SHEETS—SHEET 4.

Inventor
Walter R. Eimer
By his Attorney

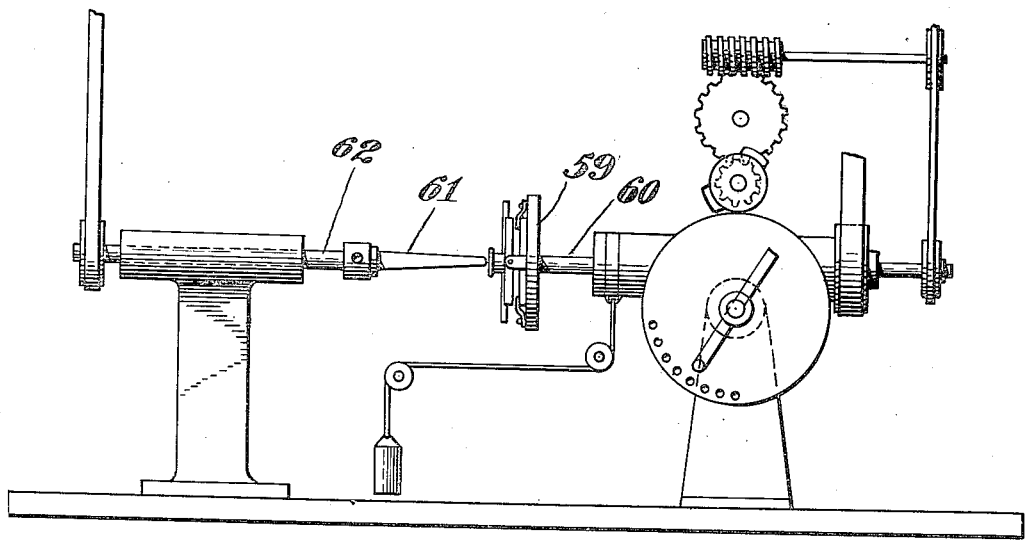
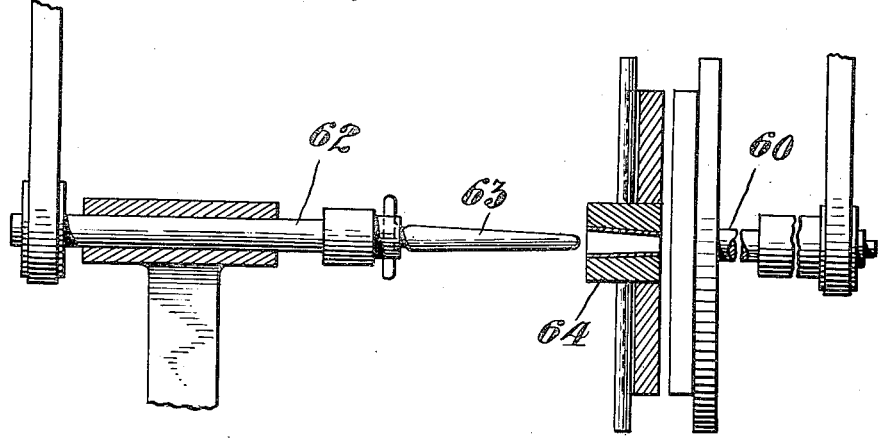

UNITED STATES PATENT OFFICE.

WALTER R. EIMER, OF NEW YORK, N. Y.

GRINDING-MACHINE FOR CLOSURE DEVICES.

1,243,496. Specification of Letters Patent. Patented Oct. 16, 1917.

Application filed April 20, 1917. Serial No. 163,363.

*To all whom it may concern:*

Be it known that I, WALTER R. EIMER, a citizen of the United States, and resident of the borough of Manhattan, in the city, county and State of New York, have invented certain new and useful Improvements in Grinding-Machines for Closure Devices, of which the following is a specification.

This invention relates to means and apparatus for grinding the surfaces of the male and female members of glass closure devices, such as locks and shells, stoppers, bottle necks, stop cocks, etc.

Hitherto in the art of grinding the engaging surfaces of glass closure devices it has been necessary to apply the abrasive under highly skilled hand pressure because owing to the frangible character of the material whose surface is to be ground, no mechanical means have been known under which it has been possible to apply that yielding and sensitive pressure which would effectively and accurately perform the grinding operation without cracking or splitting the glass undergoing treatment.

My invention in its fundamental principles comprehends in one phase thereof a reciprocally progressive method of grinding, and, in another phase, automatic centering means for the work whereby true axial alinement thereof may be maintained.

Thus my improvements in their essential characteristics comprise a machine including a reciprocatory member which may carry either a grinding tool or an article to be ground, whose forward motion is imparted under a constant, adjusted pressure, as by gravitation, only the return movement of this member, to permit the introduction of an abrasive solution, being effected mechanically, as by intermittent cam action, in the continuous operation of the machine; the progress of the work enabling the said member to move a step forward with every operative stroke thereof.

Either the work article to be ground, or the grinding tool to engage the work article carried by the reciprocatory member, may be supported by a cradle which is free to rock in opposite directions and also free to slide against the supporting surface, thereby possessing in effect a floating or universal movement, whereby, under easy non-rigid pressure, the member or article actuated will accommodate its position in axial alinement to the progress of the grinding operation, in which manner the application of grinding pressure, that might otherwise tend to disrupt the work article, is prevented from having any deleterious effect.

Other features and advantages of my said invention will hereinafter appear.

In the drawings:—

Fig. 2 is a top plan view thereof.

Fig. 3 is an enlarged partial elevation, showing the operation of the cam lifting means.

Fig. 4 is a detail of the devices employed for holding and grinding a male closure member.

Fig. 5 is a detail of the rack and pinion means for separating the grinder and work.

Fig. 8 is an elevation of a further modification of my invention, and

Fig. 9 is an enlarged detail sectional view of the same.

Figure 1:
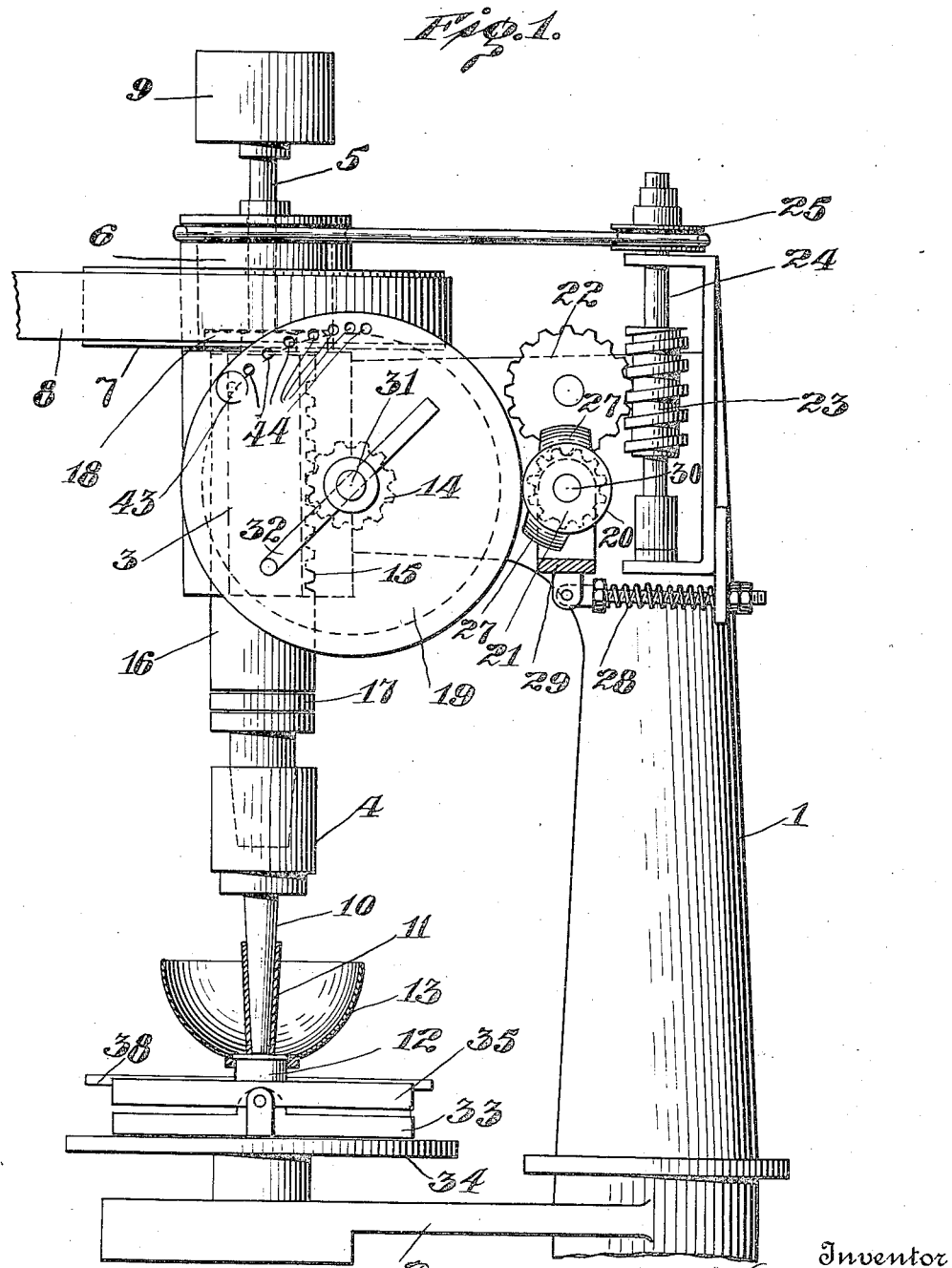
Figure 1 is a front elevation of a vertical apparatus bearing my improvements.

Referring first to that form of my invention illustrated in Figs. 1, 2 and 3, let 1 indicate a standard of the machine frame, 2 the base thereof, and 3 a slidable member, bearing a chuck 4, which is capable of both rotating and reciprocating movement.

Extending upwardly from the member 3 is a shaft 5, which is keyed to a boss 6, to be slidable in the latter, and said boss is fast upon a pulley 7, which may be driven as by a bolt 8, to thereby impart rotary motion to the shaft 5 and member 3. A weight as 9 upon shaft 5 serves to normally press the chuck downwardly in the direction of the work, whereby, as will be indicated hereinafter, the grinding operation may be performed under the influence of regulated gravity pressure.

In the example of my invention shown in Fig. 1, a male grinding tool is seen as engaged by the chuck 4, said tool appearing as a tapered stem 10 having a renewable ferrule or sheath 11, which may operatively enter the neck of a female closure device, as that indicated at 12, to grind the interior surface thereof. Said closure device may be suitably supported, as in the manner to be hereinafter described, and a surrounding hopper or cup 13, containing the abrasive mixture, serves to feed said solution to the grinding surface.

Progress of the grinding process requires that the axial movement of the chuck be of reciprocal character, in order that the tool and closure device may intermittently separate to permit fresh quotas of the abrasive solution to enter between the tool and work surfaces. Therefore I have provided means whereby the tool may be periodically lifted away from the closure device, for the stated purpose, it returning again, by gravitation, into operative engagement, when released from the lifting agency. This axial movement of the tool becomes progressive under the influence of gravitation with the advance of the work.

The means whereby the intermittent lifting of the tool is accomplished may, as shown, consist of a pinion 14 which is meshed with a rack 15 upon a sleeve 16, which fits loosely about the member 3, said sleeve resting at its lower end upon a collar 17 on said member 3, and abutting, at its upper end, against a collar 18, that is also fast to said member 3. The pinion 14 is mounted upon a wheel 19, which may be given partial turns, at periodic intervals, by suitable correlated means. As here shown the wheel 19 is given a V groove in its periphery with which a cam 20, carried by a pinion 21, is adapted to frictionally engage. The pinion 21 may be driven as by a gear 22, which meshes with a worm gear 23, whose shaft 24, by means of a pulley 25, and belt 26, derives its motion from the boss 6 and pulley 7. The cam 20 may have one or more teeth 27, spaced irregularly, about its periphery, in order that the lifting effect may be imparted to the tool at variable intervals, so as to avoid synchronizing the tool and work in their periodic reëngagement.

Suitable tension may be imparted to the cam 20 for its frictional engagement with wheel 19, as by a spring 28, extending between the frame 1 and a rock frame 29, which, with the pinion 21 and cam 20, is mounted on a shaft 30.

The shaft 31, which carries the wheel 19, is fitted with a handle 32 whereby the chuck may be lifted manually as for the purpose of fitting a tool thereto, and for placing the work in position and removing it therefrom.

The cradle, which in Figs. 1 and 3 is shown as supporting a female work piece or closure device, but which is also designed to support a female tool for the grinding of a male work piece or closure device, is so constructed and arranged, as to be capable of affording a floating or universal adjustment for the supported member. Thus, in the example of Figs. 1 and 3, wherein said cradle carries a female closure device, this may enter into axial alinement with the tool merely through the exercise of the gravitational pressure of the latter; while, on account of the freedom of universal movement possessed by said cradle, all liability of fracturing the article being ground is avoided.

Figure 7:
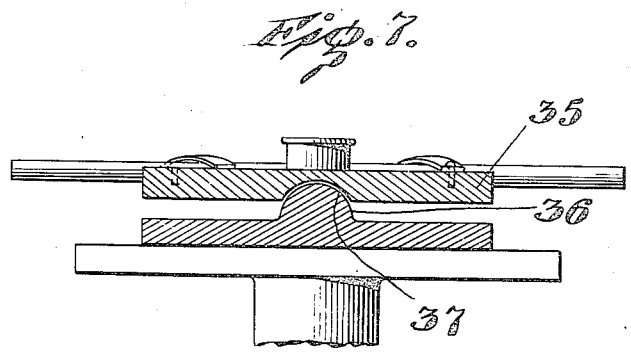
Fig. 7 is an enlarged detail of a self adjusting tool or work support.

The cradle may comprise a base member 33, freely slidable or shiftable upon a table 34, and an upper member 35, superposed upon member 33 and adapted to rock thereon, as by a concavo-convex connection, which is illustrated as by the member 33 having a convex bolster 36 which fits within a concave socket 37 provided in the under surface of the member 35. The member 35 is grooved, on its upper surface, transversely of the concavo-convex bearing described, for the reception of either the lateral supports of a female closure device, as that shown at 38 in Figs. 1, 3 and 7, or for the corresponding supports of a female grinding tool, as that shown in Fig. 4.

It will be apparent, from the foregoing description, that centering between the tool and work article will be freely and automatically effected during all stages of the progress of the work, and that under the easy pressure imposed by gravity means, in conjunction with the floating support opposed thereto, the pressure action of an artisan's hand is simulated, or at least approximated more closely than by other known mechanical means.

In the example of Fig. 4, the chuck 4 will be noted as gripping a stopper or male closure member 39. A rubber gasket 40 may be employed in the chuck connection to prevent too great rigidity in the union; similar connecting means also being employed in the case of the tool 10 (see Fig. 3). The cradle member 35, in the example of Fig. 4, may support a female tool 41, with a removable work lining 42, to receive the male article to be ground.

Regulating means with respect to the depth or extent of the grinding operation may be determined automatically by providing a stop to limit the degree of forward movement for the member 3 bearing chuck 4, and means in conjunction with the limiting means provided may also operate to either stop the operation of the machine, or to sound a bell to warn the attendant of the completion of the work, or for both purposes.

The example of such limiting and signaling means which I have indicated in the present application, consists of a stop pin, as 43, which may be inserted in any one of a series of circumferentially arranged holes, 44, provided in the wheel 19, the spaces separating these holes representing degrees of forward movement for the member 3. Thus, when the work is to be carried out for a given depth or extent, the pin 43 is inserted in the corresponding hole 44, and, consequently, when in the progress of the work, the wheel 19 has rotated so far, that the pin 43 comes in contact with a fixed stop of simple character located in the path of travel of the holes 44, then obviously, further forward movement of the member 3 is arrested.

The fixed stop may be included in an electrical circuit, as 45, having source of energy 46, and bell 47, said circuit being capable of closing through the pin 43, when the latter enters the circuit. As here shown, the circuit is formed through a casing 48, which is provided to inclose the train of gears, cam and wheel 19, whereby the intermittent release movements of the member 3 are effected, the upper edge of said casing serving as the stop or limiting member, to arrest the travel of the pin 43, carried by wheel 19.

Figure 6:
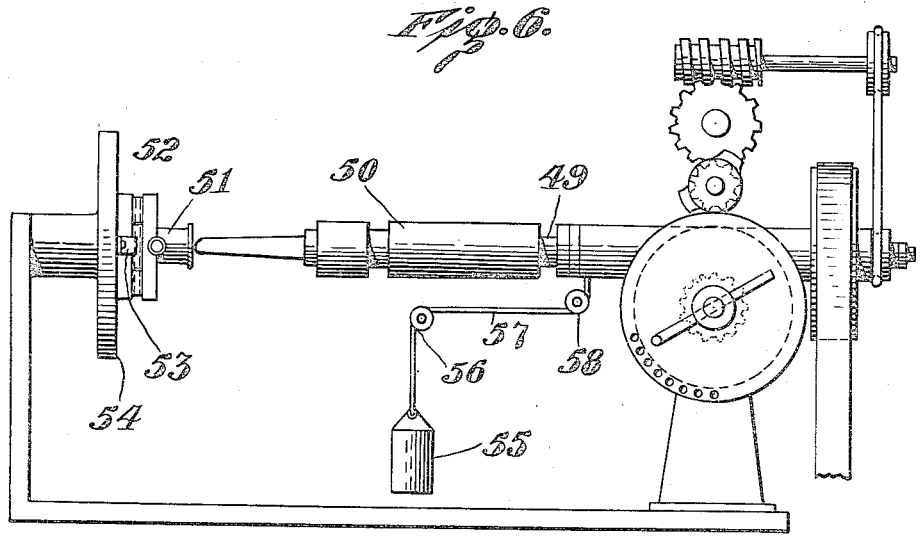
Fig. 6 is an elevation of a modified form of apparatus wherein the grinding is to be performed horizontally.

Under certain conditions of work or practice, it may be desirable to arrange the machine for horizontal grinding instead of for vertical grinding as exemplified by the arrangement of Figs. 1 and 3, and I have therefore, in Fig. 6, illustrated a horizontal arrangement of the reciprocating member 49, whereby the male tool or work article 50, is actuated horizontally in the direction of the female work article or tool 51, as the case may be. In this instance, the cradle 52 may be held under light frictional tension, as by clamps 53, against the table or support 54, upon which said cradle may shift in centering the work.

Gravity pressure is applied to control the forward progressive movement of the member 49, as by means of a weight 55, whose connector 56, passing about pulleys 57, 58, engages with the member 49, to impart the necessary forward progressive impulses to the latter, when released by its controlling mechanism, which may be of the same general character as that shown in Figs. 1 and 3, and which serve to retract said member 49, periodically.

In the further example or modification of my invention illustrated in Figs. 8 and 9, I have shown that both the tool and work article may be rotated, the rotation of these elements of course being in opposite directions, where this mode of performing the grinding operation is found desirable. Thus, in Fig. 9, I have shown the work support 59 as revoluble with the member 60, and the tool 61 as revoluble with the member 62. It is of course immaterial as to which element is given the forward impelling movement, and, obviously, both or either one of said elements may be under such impelling pressure.

In Fig. 9, the article 63 to be ground is carried by the member 62, and the tool, in this instance a female tool 64, is carried by the member 60.

It will of course be understood, in the use of my improved grinding machine, that abrasive materials of known character are to be employed, they being suspended in or used in connection with a liquid for convenience of application, and also because the moisture aids in keeping the work cool. Coarser grades of abrasive are initially employed, these being followed by finer grades for the purpose of giving a fine ground finish to the surface under treatment.

Variations may be resorted to within the spirit and scope of my said invention, and parts thereof used without others.

I claim:

1. In a machine for grinding the seating surfaces of closure devices, the combination of a tool and a work holder in opposed relation, means to revolve one of said elements, constant pressure means to move one of said elements against the other, progressively with the work, and means for periodically retracting said moving element, in equal extents.

2. In a machine for grinding the seating surfaces of closure devices, the combination of a tool and a work holder in opposed relation, driving means for one of said elements, constant pressure means to move one of said elements against the other, progressively with the work, and means for periodically retracting said moving element, in equal extents.

3. In a machine for grinding the seating surfaces of closure devices, the combination of a tool and a work holder in opposed relation, a revoluble support for one of said elements, said support being movable axially, constant pressure means to impel said support toward the work, and means for intermittently retracting said support, in equal extents.

4. In a machine for grinding the seating surfaces of closure devices, the combination of a tool and a work holder in opposed relation, an axially movable and revoluble support for one of said elements, driving means therefor, constant pressure means to impel said support toward the work, retractile means for said support, and means, coördinating with said driving means, to intermittently actuate said retractile means in equal extents, whereby the tool and work article are periodically disengaged.

5. In a machine for grinding the seating surfaces of closure devices, the combination of a tool and a work holder in opposed relation, an axially movable and revoluble support for one of said elements, driving means therefor, constant pressure means to impel said support toward the work, retractile means for said support, a cam to intermittently actuate said retractile means in equal extents, whereby the tool and work article are periodically disengaged, and means, coördinating with said driving means, to actuate said cam.

6. In a machine for grinding the seating surfaces of closure devices, the combination of a tool and a work holder in opposed relation, pressure means to move one of said elements against the other, progressively with the work, an angularly yieldable and laterally shiftable, centering support for one of said elements.

7. In a machine for grinding the seating surfaces of closure devices, the combination of a tool and a work holder in opposed relation, means to revolve one of said elements, pressure means to move one of said elements against the other, progressively with the work, means for periodically retracting said moving element in equal extents, and a fluid supply having an abrasive in suspension to automatically feed quotas thereof to the work in the retracting movements of said moving element.

Signed at the borough of Manhattan, in the city, county and State of New York this 7th day of April A. D. 1917.

WALTER R. EIMER.

Witnesses:
F. W. BARKER,
L. MOSKOWITZ.